Oct. 10, 1950     G. CHAUSSON     2,525,339

FRAMELESS BODY FOR AUTOMOBILES AND SIMILAR VEHICLES

Filed Dec. 3, 1945

INVENTOR
Gaston Chausson
BY
Richard Geier
ATTORNEYS

Patented Oct. 10, 1950

2,525,339

UNITED STATES PATENT OFFICE 2,525,339

FRAMELESS BODY FOR AUTOMOBILES AND SIMILAR VEHICLES

Gaston Chausson, Asnieres, France, assignor to Societe Anonyme des Usines Chausson, Asnieres, France, a company of France Application December 3, 1945, Serial No. 632,491
In France May 13, 1943

Section 1, Public Law 690, August 8, 1946
Patent expires May 13, 1963

3 Claims. (Cl. 296—28)

Shell coach-work, that is to say bodies without a frame, for automobile and similar vehicles, are already known. Their manufacture nevertheless implies considerable difficulties when assembling and welding the units. Moreover, those bodies which are already known are composed of a certain number of hollow bodies the manufacture of which is extremely difficult.

The object of the present invention is a body of the type in question which is constituted by two units which can be manufactured independently of each other without any particular difficulties and which can be readily assembled together in any suitable manner usual in the industry.

According to the invention, the manufacture of frameless bodies is effected from the two half shells, one of which covers the other, the upper half advantageously covering the lower half, after the manner of a box lid, and said two halves are assembled in this relative position by rational edge joints, such for instance as welds. The hollow form aimed at for the coach-work is then obtained by a suitable structure of the two halves of the shell.

In a body of this type composed of two units, according to the invention the two half shells are given a shape such that the upper portion shall essentially constitute the canopy and side walls, while the lower half forms the front floorboard or dash, the flooring and the lower portion of the boot.

According to another characteristic of the invention the side walls of the lower half shell and of the upper half shell which are to be assembled are shaped and joined together in such a fashion that they form side-members conferring great resistance to distortion of the body of the vehicle.

According to another peculiarity of the invention, the lower half shell may further be provided with a transverse reinforcement, preferably in the form of a supporting frame for the front seats.

Further features and advantages of the invention will be gathered from the following specification and from the drawings, in which the invention is illustrated by way of example:

Figure 1:
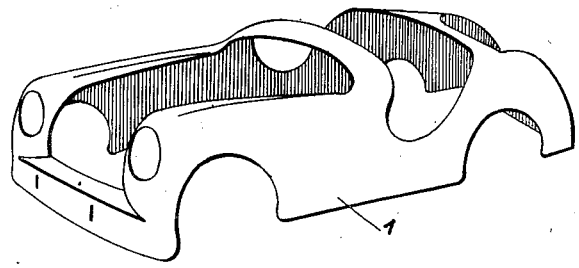
Fig. 1 is a view in perspective of the upper half shell of a body according to the invention.
Figure 2:
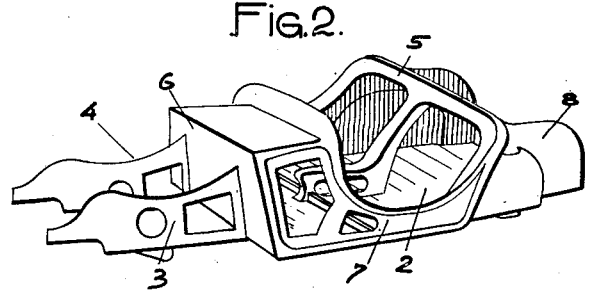
Fig. 2 is a view in perspective of the lower half shell.

It will readily be seen from the drawing that the mere assembling of the upper half shell 1 and of the lower half shell 2 already forms a body possessed of great natural resistance.

It can be seen, from the drawing, that free space may be provided for the mounting of the internal combustion engine between front dash board 6 of the lower half shell 2 and the front wall of upper half shell 1. The engine can be mounted by means of two side-members 3, 4 suitably shaped; said side-members are positioned between front dash board 6 and the front wall of the upper portion 1 of the shell, in such a manner that they shall at the same time ensure the support of the front portion of upper half 1 in relation to lower half 2. Moreover, the two side-members 3, 4 can also serve as supports for the front axle, the steering gear and the other components of the vehicle.

The assembly formed by the joining together of the two half shells 1, 2 which already possesses great natural rigidity in itself, can be further reinforced without any particular difficulty.

Thus, for instance, the transverse reinforcement afforded by front dash 6 can be further increased by a frame 5 serving at the same time as a support for the front seats.

Figure 4:
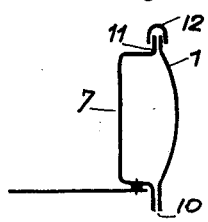
Fig. 4 is a section of a side wall of the assembled coach-work, which is constituted in the form of a hollow side-member.

The particularly active additional longitudinal reinforcement is obtained when the side walls of the finished body are constituted in the shape of hollow side-members. This can be effected without difficulty, as shown in Fig. 4, by a suitable structure of the side walls of both halves of the shell. If the walls of the finished coach-work have to be clean and smooth outwardly, arrangements can be made whereby the upper half 1 of the shell encases the lower half 2 of said shell; it then suffices for the side walls of the lower half 2 of the shell to offer recesses or stampings 7 for hollow side-members to be formed by the interconnected lateral walls. Said two lateral side-members, which are extended towards the front by side-members 3, 4 and towards the rear by side-walls 8 of the boot, confer perfect longitudinal resistance to said extensions of the two sides together with the finished coach-work.

The side walls of the two halves 1, 2 of the shell, shown in section in Fig. 4, are with advantage assembled in the usual manner by lines of welding. The welded joint remains open at the meeting point 10 after being completed, as said joint remains concealed underneath the completed vehicle. On the other hand, the welded joint is covered at the point of meeting 11, rationally by a butt-strap. In the finished body shown in Fig. 3, the butt-strap 12 then lines the opening of the body-work and thus contributes considerably to the embellishment of the vehicle.

A frameless body manufactured according to the invention is perfectly rigid and fulfils all requirements, notwithstaning the simplicity of its construction and the small amount of raw material it demands.

The coach-work according to the invention can assume any practically usable shape and can be manufactured with all suitable materials. In each case, of course, the means and methods of assembly of the two portions of the shell must be adapted to the raw materials employed.

It is even possible to manufacture the upper half of the shell in cast or moulded plastic material (artificial resin or any other) and the lower half of the shell in metal. With this composition method of manufacture, it likewise suffices to apply the suitable means and processes of assembly.

In large vehicles in particular, the two half shells may, on their part, be manufactured in several portions. It is possible to finish these parts completely prior to assembling. But it is also possible to build up the lower half of the shell first and then to lay the upper half on it.

Figure 3:
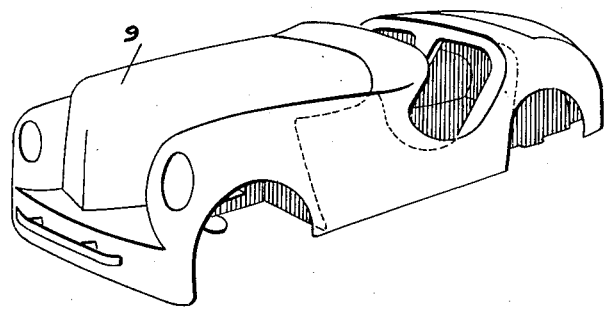
Fig. 3 shows the assembly of the upper half shell completed by the bonnet of the engine with the lower half.

Finally, Fig. 3 further shows that individual parts of the body-work can also be made in the form of independent units. Thus, in the upper half of the shell, engine bonnet 9 can be independently mounted.

What I claim and desire to secure by Letters Patent of the United States is:

1. A frameless body for automobiles and similar vehicles, comprising in combination with an upper half-shell, a lower half-shell fitting within said upper half-shell and comprising a floor portion, a dashboard extending upwardly from said floor portion, two parallel engine-supporting side members extending forwardly from said dashboard, a seat-supporting, transverse frame extending above said floor portion, and other side members extending between said frame and said dashboard and parallel to the first-mentioned side members; said upper half-shell having side walls extending over said other side members of the lower half-shell and at a distance therefrom to provide a hollow space therebetween, the upper edges of said other side members extending adjacent to the upper edges of said side walls, and lines of welding joining the upper edges of said other side members with the upper edges of said side walls.

2. A frameless body for automobiles and similar vehicles, comprising in combination with an upper half-shell, a lower half-shell fitting within said upper half-shell and comprising a dashboard, side members connected with said dashboard and having outwardly extending upper edges; said upper half-shell having outwardly curved side walls extending over said side members of the lower half-shell and at a distance therefrom to provide a hollow space therebetween, the upper edges of said side members extending adjacent to the upper edges of said side walls, and a welded joint connecting the upper edges of said side members with the upper edges of said side walls.

3. A frameless body for automobiles and similar vehicles, comprising in combination with an upper half-shell, a lower half-shell fitting within said upper half-shell and comprising a dashboard, side members connected with said dashboard and having upper edges and lower edges extending outwardly substantially at right angles thereto; said upper half-shell having outwardly curved side walls extending over said side members of the lower half-shell and at a distance therefrom to provide a box-like enclosure therebetween, the upper edges of said side members extending adjacent to the upper edges of said side walls, and a welded joint connecting the upper edges of said side members with the upper edges of said side walls.

GASTON CHAUSSON.

REFERENCES CITED

The following references are of record in the file of this patent:

UNITED STATES PATENTS

| Number | Name | Date |
| --- | --- | --- |
| 1,365,211 | Trinca | Jan. 11, 1921 |
| 1,483,650 | Corbin, Jr. | Feb. 12, 1924 |
| 1,563,803 | Southern | Dec. 1, 1925 |
| 2,071,592 | Thompson | Feb. 23, 1937 |
| 2,190,551 | Swallow | Feb. 13, 1940 |
| 2,242,269 | Siebler | May 20, 1941 |
| 2,344,092 | Komenda | Mar. 14, 1944 |
| 2,356,008 | Schafer | Aug. 15, 1944 |